(No Model.)

J. G. ROBINSON.
HOLDBACK FOR VEHICLE SHAFTS.

No. 536,099. Patented Mar. 19, 1895.

Witnesses
C. W. Miles
Oliver B. Kaiser

Inventor
J. G. Robinson
By Wood & Boyd
Attorneys

UNITED STATES PATENT OFFICE.

JUDSON G. ROBINSON, OF WASHINGTON COURT-HOUSE, OHIO.

HOLDBACK FOR VEHICLE-SHAFTS.

SPECIFICATION forming part of Letters Patent No. 536,099, dated March 19, 1895.

Application filed October 1, 1894. Serial No. 524,638. (No model.)

*To all whom it may concern:*

Be it known that I, JUDSON G. ROBINSON, residing at Washington Court-House, in the county of Fayette and State of Ohio, have invented certain new and useful Improvements in Holdbacks, of which the following is a specification.

My invention relates, first, to a thill attachment employed as a hold-back; second, to attachments to the thill and harness which obviate the use of breeching and hold-back straps attached to the breeching and thills.

By means of my device simple and better means are employed to harness a horse to a sulky or carriage.

By the use of my device a horse can be attached to a sulky and released therefrom much faster than when the ordinary breeching and hold-back straps are employed.

The various features of my invention will be more fully set forth in the description of the accompanying drawings making a part of this specification, in which—

Figure 1:
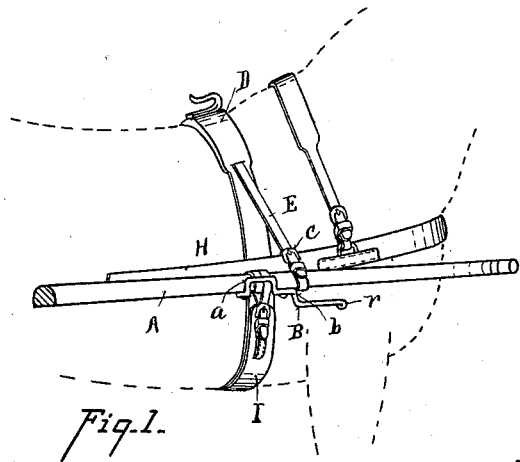
Figure 2:
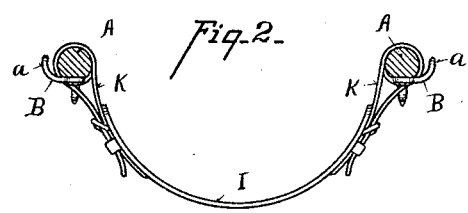
Figure 3:
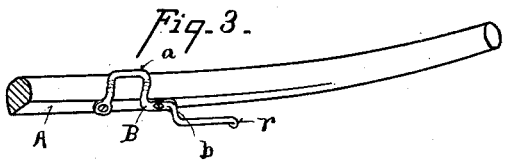
Figure 4:
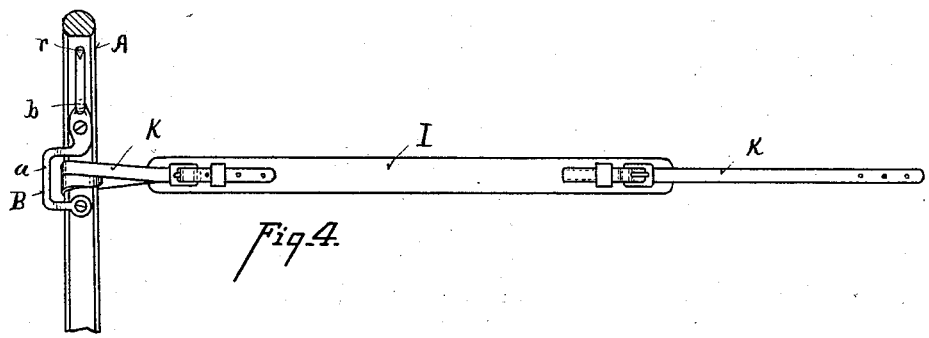

Figure 1, is an illustration of my improvement in use. Fig. 2, is a cross section through the thills of a sulky with my attachment in elevation. Fig. 3, is a perspective view of my thill attachment applied. Fig. 4, is a bottom plan view of the thill iron and harness strap.

A represents thills of, say, a sulky; B, a hold-back iron. $a$ represents an eye or loop formed in said attachment.

$b$ represents a stop against which the saddle loop $c$ rests in the act of holding back.

$r$ represents a finger or guard projecting forward over the loop.

D represents the saddle or back pad of the harness; E, the hold-back strap; H, the trace strap; I, the belly girth; K, the thill straps which project from the girth and are passed around the thills preferably twice within the loop or eye $a$ and the end of the strap buckles to the girth I so that the belly girth is rigidly strapped to the thills and hold-back loop without being attached to the harness. By this means the thills are steadied and held in proper position by the girth I and the loop $c$.

The horse is freed from the vehicle by unhitching the trace straps and by unfastening the belly girth on one side.

Having described my invention, what I claim is—

1. A hold-back device for a thill, comprising the eye $a$ projecting laterally to one side of the thill, the downwardly projecting stop $b$, and the rigid guard or finger $r$ projecting forward horizontally beneath the thill and parallel thereto, substantially as described.

2. In combination with the hold-back having the eye $a$, stop $b$ and the guard or finger $r$, of the belly girth strapped to the thills at each end within the eye $a$ by thill straps K, and the hold-back strap E buckled about the thills forward of the stop $b$ and beneath the guard or finger $r$, substantially as described.

In testimony whereof I have hereunto set my hand.

JUDSON G. ROBINSON.

Witnesses:
A. C. PATTON,
T. E. DEWEES.